United States Patent [19]
Hesse et al.

[11] Patent Number: 5,965,021
[45] Date of Patent: Oct. 12, 1999

[54] HYDROCYCLONE

[75] Inventors: Wayne W. Hesse; Howard T. Marles, both of Calgary, Canada

[73] Assignee: Fluid Dynamics Corporation, Calgary, Canada

[21] Appl. No.: 08/786,078

[22] Filed: Jan. 17, 1997

[51] Int. Cl.[6] .......................... B01D 21/26; B01D 17/038
[52] U.S. Cl. .................................... 210/512.2; 210/512.1; 210/112; 210/115; 210/117; 209/715; 209/717; 209/718; 209/720; 209/728; 209/733; 209/734; 55/459.1; 55/459.4
[58] Field of Search .............................. 210/512.1, 512.2, 210/109, 112, 115, 117; 209/715, 717, 718, 720, 728, 733, 734; 55/459.1, 459.2, 459.3, 459.4, 459.5

[56] References Cited

U.S. PATENT DOCUMENTS

| | | | |
|---|---|---|---|
| 3,817,388 | 6/1974 | Trawinski | 210/322 |
| 4,163,719 | 8/1979 | Macierewicz et al. | 210/84 |
| 4,414,112 | 11/1983 | Simpson et al. | 210/512.1 |
| 4,820,414 | 4/1989 | Carroll et al. | 210/512.1 |
| 4,857,197 | 8/1989 | Young et al. | 210/512.1 |
| 5,021,165 | 6/1991 | Kalnins | 210/703 |
| 5,071,557 | 12/1991 | Schubert et al. | 210/512.1 |
| 5,093,006 | 3/1992 | Kalnins | 210/704 |
| 5,116,519 | 5/1992 | Michaluk | 210/512.1 |
| 5,824,212 | 10/1998 | Brockhoff | 210/512.1 |

FOREIGN PATENT DOCUMENTS

| | | |
|---|---|---|
| 1063974 | 9/1979 | Canada. |
| 0313197 A2 | 4/1989 | European Pat. Off.. |
| 0159808 | 10/1985 | WIPO. |
| WO 89/04726 | 6/1989 | WIPO. |
| WO 89/09653 | 10/1989 | WIPO. |
| WO/95/10345 | 4/1995 | WIPO. |

OTHER PUBLICATIONS

"Hydrocyclones for Treating Oily Water: Development and Field Testing in Bass Strait", Hayes et al., Offshore Technology Conference, 1985.
"A New High Efficiency Liquid/Liquid Separator", Woillez et al., Chapter 8 of Proceedings of the 4th International Conference (Multi–phase Flow, 1989, pp. 117–132.
"Conoco's water treatment upgraded with hydrocyclones", Kerstin Rosie, Ocean Industry, Dec. 91/Jan. 92, pp. 19–24.
"Rotary Cyclone Will Improve Oily Water Treatment and Reduce Space Requirement/Weight on Offshore Platforms", Gay et al., Offshore Europe 87(Society of Petroleum Engineers), 1967.

Primary Examiner—David A. Reifsnyder
Attorney, Agent, or Firm—Thomas E. Malyszko

[57] ABSTRACT

There is provided a hydrocyclone which operates on a relatively low pressure differential and on a linear flow principle. The hydrocyclone comprises an inlet chamber with a vortex creating a spiral insert therein, which inlet chamber opens in to a frustoconical portion of the hydrocyclone body. The frustoconical portion opens into a cylindrical portion which leads both to the accept and reject outlets at the end. The hydrocyclone is particularly useful for on sight separation of produced water in oil fields. The invention also provides hydrocyclone units of linked hydrocyclones according to the present invention, fluid separation systems incorporating hydrocyclones of the invention and methods of separating fluids using hydrocyclones in the invention.

19 Claims, 7 Drawing Sheets

HYDROCYCLONE

THE PRESENT INVENTION relates to apparatus and methods for separating fluids particularly a novel hydrocyclone method of operation of same.

In the process of extracting crude oil from the earth's crust, the oil that is brought to the surface is contaminated with many other substances, notably various amounts of water, gas and minerals which are blended with the oil in an emulsion. Before the oil is refined, the water, gas and other elements must be removed from the oil to such an extent that the oil is of a sufficient quality to allow it to be shipped through a pipeline.

The water is contained in tiny droplets held in suspension in the oil by a film that surrounds the water droplet. For separation to take place, it is necessary to break the film to allow the water droplets to mingle with other water droplets and so coalesce and separate from the oil phase. Coalescence is speeded up in five common ways, thermal, mechanical, chemical, gravitational and electrical in a separation process referred to as "treating". Whichever method is used, the apparatus used to carry out such treating is known as an oil treater.

Unfortunately, the separation of the water from the oil is never complete and, accordingly, the water accompanying the crude oil, known as produced water, is itself contaminated with oil. Before that water can be reintroduced into the environment, that water itself must be treated to remove as much of the oil as possible. In this respect, with increasing environmental concern, the standards of water purity that must be attained before the water can be returned to the environment are increasing. Furthermore, the traditional oil well begins to produce increasing amounts of water in the crude oil with the increasing life of the oil well. This, combined with an increasing use of water drive recovery methods and horizontal drilling technology, has led to an increased prevalence of produced water. Furthermore, treatment of produced water is becoming a concern because both mainland and offshore fields are maturing faster than expected.

Whilst there has always been a need to separate produced water from oil and to treat the separated oil to produce oil of a given quality, the need to remove oil from produced water, particularly to stringent levels now required, is a relatively new development in the field and one which, to date, has not been satisfactorily met. Most water clarification systems were developed many years ago when water production was low and oil production high and water quality was not a concern. In the early days, produced water was routed to large tanks or pits where it was left for a considerable time to allow the water and the oil to separate out naturally. Oil was periodically skimmed off the surface and water, still of extremely poor quality, was often injected into highly permeable disposal zones or even allowed to run off or evaporate. Similarly, in the early days of offshore development, produced water was discharged directly from the equipment with minimal or no treatment and was of no concern if no slick or heavy sheen on the ocean surface was created.

The recent requirement for greater purity of produced water has led to many ways being attempted of treating produced water to the required quality and purity levels in an efficient and cost-effective manner. One attempt was to recycle the water by the "water drive mechanism" for enhanced oil recovery. In this system, the produced water is pumped back into the oil formation to assist in the maintenance of reservoir pressure and production rates. Whilst this method, at its inception, appeared to be effective, in some cases the water being reinjected contained too high-concentration of dispersed oil and hydrocarbons which were subsequently thought to be responsible for the plugging of many varieties of reservoirs. This, in turn, resulted in expensive maintenance work to rejuvenate the plugged wells.

After the problems with attempts to recycle the water became clear, the industry in general moved towards treating produced water to obtain the required water purity and, at the same time, maximise oil recovery. Initially, the oil industry purchased large diameter oil treating equipment to handle increased amounts of produced water or, in the alternative, an additional separation vessel, upstream of the oil treater, which was used primarily for the removal of free water associated with inlet flows. Some oil producers have installed expensive filtration systems to clean produced water because the inability of existing gravity based separation equipment to provide a proper outlet quality on the produced water portion of the production stream. Whilst the treatment with either filtration systems or with the larger equipment may be to a greater extent successful, neither is either economical or efficient.

In this respect, whilst operating larger vessels, a great deal of the process heat duty needed to treat oil emulsions is transferred to the produced water phase making the vessel very inefficient and expensive to operate. Such larger vessels are usually a version of either the free water knock out additional separation vessel mentioned above or an oil treating vessel, neither of which is designed or capable of processing efficiently both the oil and water phases simultaneously. There is, furthermore, a great deal of expense associated with using such additional heat and chemicals for produced water clean up and this is neither economic nor efficient. The currently used methods, to meet compliance with water discharge quality requirements, are based around mechanical or chemical changes to existing continuous stream-producing operations.

However, a further problem in this respect is the decrease in water retention time. In this respect, water volumes produced from oil have increased up to the point where retention times are often less than five minutes in some production operations. With the speed of movement of water through the system, it is very difficult to remove insoluble organics from produced water so that a suitable water outlet quality can be met. At present, this problem is being tackled in three ways, either by increasing water residence time using new equipment, changing the existing equipment so that it operates theoretically more efficiently and implementing chemical technologies to get maximum water clarification with existing equipment. Unfortunately, all three methods are inefficient and, therefore, uneconomic.

There exists today the need for a further crude oil treating system and, more particularly, a produced water treating system, which is capable of handling large volumes of produced water very quickly but, at the same time, being efficient and economic.

The most common types of produced water treatment apparatus currently used are gravity separators, such as skimmers, gas flotation cells and coalescing vessels which operate under Stoke's Law, which governs the velocity at which a droplet of oil will travel through water. In the same technical field, there are separators that use centrifugal force rather than gravity, one of which is the hydrocyclone. The hydrocyclone is a conical shaped vessel into which the mixed flow to be separated is placed, via an inlet, into the broad end and a vortex is created within the hydrocyclone. As the fluid passes towards the narrow end of the cone, the vortex causes the denser water phase to be flung outwards whilst the lighter phase is displaced to the centre of the tube diameter. In the case of oily water, this means that the water is displaced to the outside of the vortex whilst the oil remains as a central core. The central core oil is removed from the inlet end of the conical vessel whilst the pressures within the hydrocyclone cause the oil phase to reverse flow through the centre of the vessel to exit from the narrower end of the vessel.

Hydrocyclones were originally designed for solid/liquid separations but, with time, they have been applied in several different industries and have worked successfully in some liquid/liquid applications. The general principle of operation is to exert a high velocity and centrepetal force so as to separate the two mixed substances by virtue of their differing specific gravities. The design theory relies heavily on the conical shape of a large diameter at the inlet end and a relatively very small diameter at the heavier phase outlet end. It is the use of this conical shape which provides the necessary velocities for the use of the hydrocyclone.

In order to produce the velocity and centrifugal forces necessary for separation of two substances, traditional hydrocyclones utilise a tangential entry opening into the circular conical body of the hydrocyclone tube. The central core which the lighter phase assumes must be established relatively quickly in order to depart the tube end opposite the continuous phase outlet, since this is at the same end as the inlet feed. In order for this to be accomplished, it is necessary to create the high velocity spiralling motion inside the tube and it is, therefore, necessary for the conical shaped tube to be equipped with very small outlet openings for each of the departing substances which are normally 2 to 4 millimetres in diameter. When the departing substances pass through these openings, they experience pressure drop and it is this pressure drop which governs the efficiency of the conical hydrocyclone tube.

The compact design, low weight, lack of moving parts, low maintenance costs and high efficiency of hydrocyclones have made them the preferred de-oiling system for some offshore operations. The hydrocyclone spins the oily water mixture inside the unit at up to 30,000 rpm generating a centrifugal force in the order of magnitude of one thousand G's to drive the oil droplets through the water. The hydrocyclone has a very small diameter and thus there is a very short distance for the oil droplet to move in order to separate from the water. This means that the system has a residence time of less than two seconds compared to the range of six to sixty minutes usually required for gravity based separation systems and, therefore, need not be of a large size.

However, there are several drawbacks to the prior art type hydrocyclones which make them unsuitable for efficient usage for the treatment of produced water in oilfield applications.

The most important drawback is the high differential pressure required to operate, typically 50 psig. It is claimed that the more pressure available, the more cost effective hydrocyclones are but, unfortunately, many oil fields do not have sufficient surface pressure to drive the hydrocyclone whilst maintaining acceptable production rates. It is not practical to place a traditional hydrocyclone on every water source but it is much simpler to gather the water at a single low pressure point. In such cases, low shear pumps must be used to provide the required pressure which adds to the complexity, size, weight, operating and maintenance requirements of the system and increases expenditure and decreases efficiency considerably. Furthermore, as stated above, it is necessary to create a high velocity spiralling motion inside the tube for which a conical shaped tube is necessary. The conical tube must be equipped with small outlet openings for each of the departing substances which openings are normally 2 or 3 millimetres in diameter. Not only does this lead to an extremely high pressure drop when the departing substances pass through the openings, requiring the use of pumps, but such small openings are also susceptible to plugging as soon as there is the presence of solid particles larger than those openings, which is often the case in oilfield applications.

Another problem found with prior art hydrocyclones is the problem of substantial gas in solution in crude oil inlet streams which typically contain water concentrations in excess of 75%. Solution gas may also be a contaminant of water streams which also is unable to be removed by hydrocyclones of the prior art.

It is an object of the present invention to find an efficient and economic way of separating produced water to a high quality, thereby meeting current environmental standards and increasing the efficiency of oil extraction.

According to the present invention, there is provided a hydrocyclone comprising an inlet chamber, which inlet chamber comprises means for creating a spiralling motion, such as a vortex, in a fluid, a hydrocyclone body, which body comprises a first, frustoconical, portion and a second, cylindrical, portion, and at least one outlet, wherein the inlet chamber communicates with the end of the first portion of the body and the outlet is positioned at the end of the second portion of the body.

Preferably, the means for creating a spiralling motion comprises a spiral insert located within the inlet chamber. Preferably, the spiral inlet comprises at least one helical vane arranged around a central cylindrical core.

It is preferred that there are a plurality of outlets positioned at the end of the second portion of the body and it is particularly preferred that the radial spacing of at least two of these outlets, at the end of the second portion of the body, differs.

It is particularly preferred that the outlets at the end of the second portion of the body comprise at least one accept outlet located adjacent the edge of the end of the second portion of the body and at least one reject outlet located adjacent the centre of the end of the second portion of the body. In one embodiment of the present invention the reject outlet is positioned closer to the frustoconical portion of the body than the accept outlet, although the two outlets may be placed equidistant from the frustoconical portion of the body or the accept outlet may be positioned closer to the frustoconical portion of the body.

It is particularly preferred that the pressure differential between the at least one outlet and the inlet chamber be adjustable. It is more preferable that the pressure differential be adjustable by means of at least one valve located on at least one of the inlet chamber and the outlet preferably on the outlet. It is particularly preferred that the pressure differential may be controllable manually or by a computer so as to maintain a required pressure differential between the at least one outlet and the inlet chamber to ensure maximum efficiency of working of the hydrocyclone chamber.

According to a second aspect of the present invention there is further provided a fluid separation system comprising a hydrocyclone according to the present invention. It is preferable that the fluid separation system is for separating a mixture of oil and water. It is particularly preferred that the fluid separation system further comprises an oil treater.

In a further aspect of the present invention there is provided a hydrocyclone unit which comprises a plurality of hydrocyclones according to the present invention. In one embodiment of this aspect of the present invention at least two hydrocyclones are linked in series. In an alternative embodiment of this aspect of the present invention two hydrocyclones are linked in parallel.

There is further provided a method of separating fluids which comprise passing the fluid through at least one of a hydrocyclone, a hydrocyclone unit or a fluid separation system according to the present invention.

As discussed above, the problem with prior art hydrocyclones and the reason that such hydrocyclones are not widely used in oil fields for separating produced water is the problem of the requirement of high pressure differentials across the hydrocyclone together with the linked problem, identified by the inventors, of the necessity of having small, easily cloggable, outlets to assist in creating such a pressure differential. These problems lead to inefficient and uneconomic working of such hydrocyclones in separation of produced water.

The hydrocyclones of the present invention overcome both these problems by virtue of the new and inventive design. In this respect, the means for creating a spiralling motion, preferably the spiral insert in the inlet chamber, exerts high centrifugal force on the fluid before it enters the main body of the hydrocyclone. This means that the whole of the body of the hydrocyclone need not be conical in order to maintain velocity and centrifugal force. The velocity is increased in the frustoconical portion of the body but, instead of having to be extended to a point, the conical section of the body may be truncated at a reasonable diameter and the rest of the body may continue as a cylinder in which the separation of the fluids has, surprisingly, been found to be maintained. At the end of the cylinder, with the fluid separated, the cross section of the cylinder is sufficiently large to allow both the accept (water) and reject (oil) outlets to be placed at the same end of the hydrocyclone body, remote from the inlet chamber. This, in turn, removes the requirement for a reverse flow within the hydrocyclone, which reverse flow is a major factor in the prior art requirement of a high pressure differential.

The linear flow hydrocyclone of the present invention requires a much lower pressure differential than is required in the prior art hydrocyclones. This not only allows the hydrocyclone to be used efficiently and economically in the field but, further, allows the provision of larger outlets which are less easily clogged, and also provides for the removal of solution gas, thereby removing the other main problem associated with the prior art.

The gas may be removed from solution by the hydrocyclone of the present art using a combination of the inlet flow capacity and the orifice size allowing the gas to come out of solution.

In this respect, another reason for locating the prior art reject and accept outlets at opposite ends of the prior art hydrocyclone tube appears to be that, given the conical nature of the prior art hydrocyclone body, the end of the prior art hydrocyclone body opposite the inlet chamber was very narrow. Placing of both outlets at the same end would have meant that the lighter phase would have to first pass through the departure area of the heavier substance, which operates at a higher outlet rate and may have resulted in fluid remixing at this point, thereby drastically reducing efficiency of the hydrocyclone. As stated above, the provision of a cylindrical portion of the body following a truncated conical portion allows direction of both separated substances to a common outlet end by avoiding the need for a high degree of conical shape, thereby providing a greater area at the outlet end of the hydrocyclone body for safe removal of both separated substances. This is primarily due to the provision of means for creating a spiralling motion in the inlet chamber which is capable of providing the necessary velocities and centrifugal forces needed for the separations without the need of a great deal of conical shape in the hydroclone body to promote further velocity. This advance in the art has not been foreshadowed in any work so far undertaken.

As discussed above, hydrocyclones of the present invention operate at a considerably lower differential pressure than those of the prior art and, accordingly, are able to operate a more efficient system than that currently proposed. Current hydrocyclone technology and designs require a minimum differential pressure across their systems in a range of 50 to 100 psig in order to perform an efficient separation of an oil and water mixture. Current oil treating systems, however, operate in the range of 40 to 60 psig maximum which is insufficient to lead to efficient separation in a prior art hydrocyclone. At present, water treating systems overcoming this problem incorporate pumps to pump the water to be treated at a relatively high pressure into the hydrocyclone. As stated above, this is extremely inefficient, causing unnecessary expenditure of energy. The pump action also remixes the oil and water emulsion thereby reversing any gravity separation which may have taken place and causing the dispersed phase droplets to break into smaller droplets causing a more stable and mixture making it even more difficult for the prior art hydrocyclone to separate the oil and water, thus reducing efficiency of the system still further.

An alternative approach that had been considered would be to move the pumps and place the hydrocyclone directly after an oil treating pressure vessel which had been appropriately altered to cope with higher pressures, allowing higher pressure produced water to be passed to the hydrocyclone. However, from a mechanical design standpoint, the larger the diameter the thicker the shell of the pressure vessel which results in a proportional increase in the cost of fabrication per inch of thickness required to meet the appropriate reinforcement requirements and internal pressure requirements. Current oil treating pressure vessels are designed primarily for maximum 75 psig design pressures which allows them to operate at 40 to 60 psig safely. Typical oil treater diameters are 6, 8 and 10 ft. diameters. An attempt to increase a design pressure to 100 psig on such vessels with diameters such as these would almost double the current cost of such vessels thereby making them extremely uneconomic.

A further attempt to increase the efficiency of prior art hydrocyclones in the treatment of produced water in oil fields is to ensure that the produced water is heated before entering the hydrocyclone. In this respect, the separation and efficiency of hydrocyclones is dependent on the viscosities of the two fluids and in oil field applications the water viscosity is a prime concern. To date, attempts to use hydrocyclones in separation of produced water have required at least a warm mixture. The addition of heat to the mixture prior to hydrocyclone processing reduces the oil viscosity within the mixture and thereby increase dispersed droplet size so as to enhance separation conditions. However, this process further increases the cost of operation and reduces the economic efficiency of the operation of such a system.

The present invention allows the provision of a hydrocyclone which operates at a lower differential pressure than the prior art hydrocyclones. Separations can be accomplished at differential pressures between 30 and 50 psig but may be achieved at differential pressures as low as 5 to 10 psig. The differential pressure may be adjusted by increasing or decreasing orifice size and increasing or decreasing inlet and outlet flows to and from the body of the hydrocyclone. The adjustment may be achieved either through manual or automatic operation of an inline valve and may be achieved through the use of computers or other types of automatic control. One envisaged embodiment is the use of a manual or pneumatically actuated back pressure control valve.

The frustoconical section may have its internal conical angle changed or adjusted to suit specific applications. The limitations on the length of the frustoconical section is governed by the internal angle joining the frustoconical section and the cylindrical section portion or orifice, as will be apparent to a person skilled in the art.

The cylindrical process tube may be of any suitable length but should be of a length sufficient to ensure that complete separation of the fluids takes place.

The means for creating a spiralling motion may be any appropriate means but one preferred embodiment is a spiral insert comprising a cylindrical core with a helical vane therearound. Such an insert is described in Canadian Patent No. CA-A-1063974. In that document, a spiral insert is described for use with a traditional shaped hydrocyclone for particular use with fluids comprising suspensions of solid in liquid. The retention of the conical shaped hydrocyclone in the disclosure of this document means that certain of the problems of the prior art, such as a relatively high differential pressure due to the requirement for reverse flow and small outlets, are not overcome.

The outlets are all positioned at the free end of the cylindrical portion of the hydrocyclone tube. In a preferred embodiment of the invention, the accept outlets, which accept the heavier, water phase are positioned at equidistant intervals around the edge of the circular end of the cylindrical portion of the hydrocyclone body. The reject outlet, through which the oil is taken, is positioned in the centre of the end of the cylindrical portion of the hydrocyclone body. In this way, the relative outlets are positioned in the middle of the separated streams of the two fluids thereby reducing the likelihood of removal of a mixture of the two fluids from the interface of the two streams of fluid.

It is particularly preferred that the reject outlet be at the end of a removable reject outlet chamber which reject outlet chamber extends, from the end of a cylindrical portion, into the cylindrical portion towards the frustoconical portion.

One preferred embodiment of the present invention will now be described with reference to the accompanying drawings, by way of example, in which.

Figure 1:
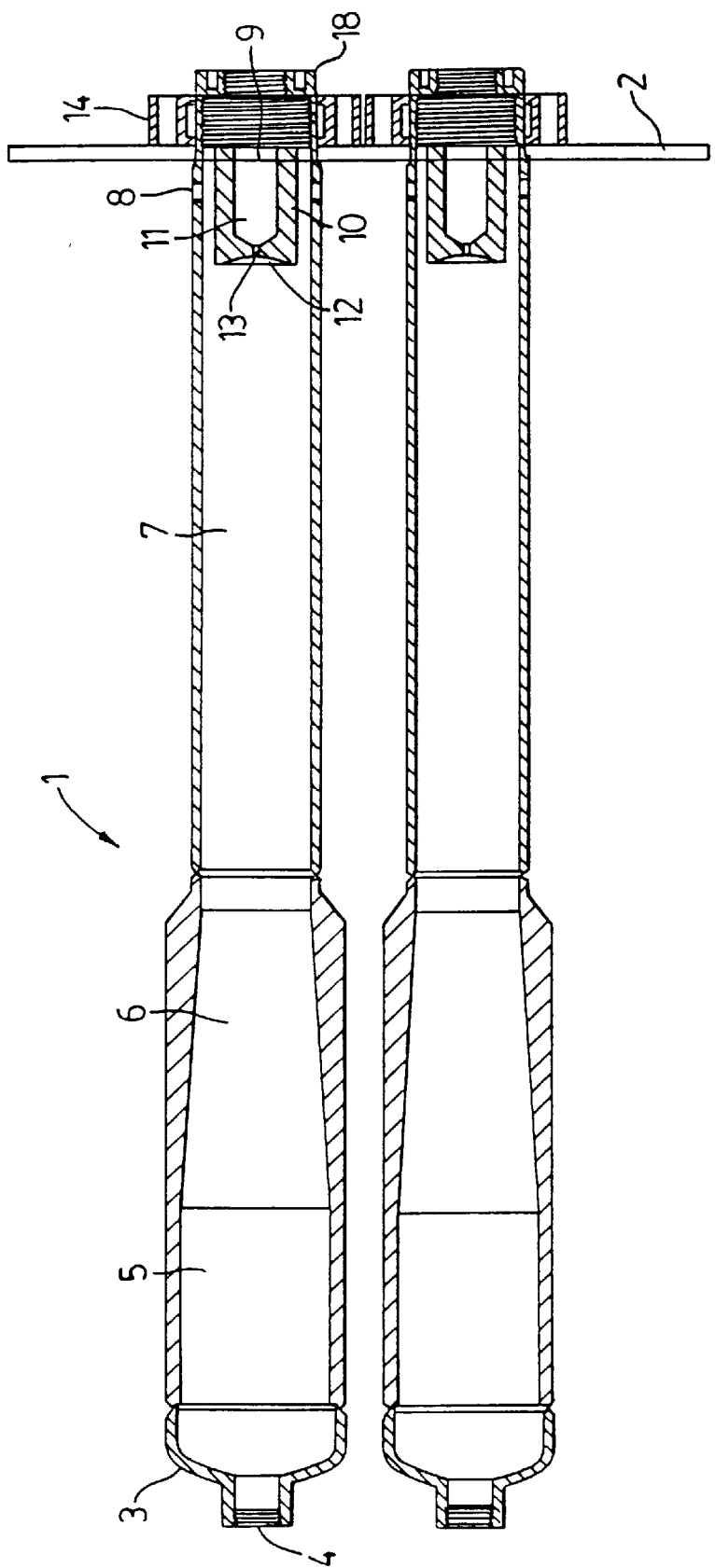
FIG. 1 shows a cross sectional view of two hydrocyclones of the present invention connected in parallel.

In FIG. 1, there are shown two hydrocyclones 1 linked together in parallel by a divider plate 2. The hydrocyclones comprise an entry cap 3 in the top of which is an inlet flow aperture 4. The cap 3 is attached to the open end of an inlet chamber 5. The inlet chamber 5 is contiguous, at the other end thereof, with a frustoconical portion 6 of the body of the hydrocyclone 1. The frustoconical portion 6 is attached, at the other end thereof, to a process tube 7 which forms the cylindrical portion of the body of the hydrocyclone 1. At the free end of the process tube 7 is the divider plate 2. The divider plate comprises a locating aperture 21 therethrough in which the free end of the process tube 7 of a hydrocyclone is located and secured by means of a sealing ring 14. Located around the side wall of the process tube 7 are six equally spaced accept outlets 8. Located within the free end of the process tube 7 is a reject insert 10 which extends into the body of the process tube 7. The reject insert 10 is hollow and within the reject insert 10 is formed a reject chamber 11. The free end of the reject insert 10, located within the process tube 7, is a dished end 12 in the centre of which is located the reject outlet 13.

The hydrocyclone 1 is held to the divider plate 2 by means of a sealing ring 14 which is located on the other side of the divider plate 2 from the hydrocyclone 1.

Figure 2:
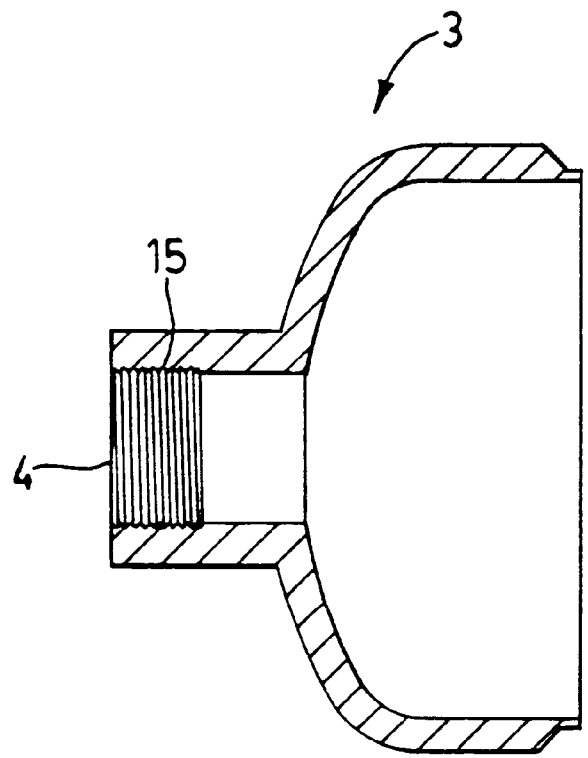
FIG. 2 shows a cross sectional view of the cap of a hydrocyclone of FIG. 1.

FIG. 2 shows a cross section of the cap 3 of the hydrocyclone 1 of FIG. 1. As can be seen, the interior wall 15 of the inlet aperture 4 of the cap 3 is threaded to allow attachment thereto of an inlet pipe through which an oil/water mixture is introduced to the hydrocyclone.

Figure 3:
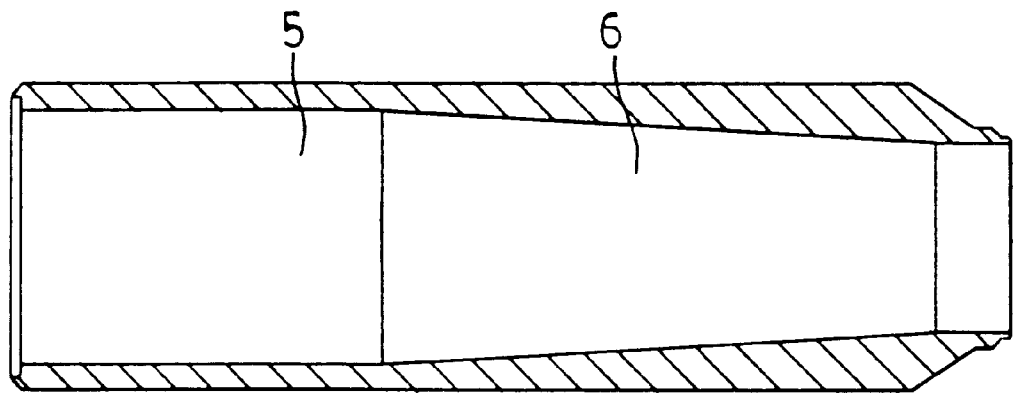
FIG. 3 shows a cross sectional view of the inlet chamber and frustoconical portion of a body of the hydrocyclone of FIG. 1.

FIG. 3 shows the inlet chamber 5 and the contiguous frustoconical portion 6 of the hydrocyclone 1. As can be seen, the inlet chamber 5 is basically cylindrical in cross section. Located within the inlet chamber is the spiral motion creating device which is not shown in FIG. 3. The interior of the frustoconical section 6 tapers relatively gently inwards to a diameter approximately three quarters the diameter of the inlet chamber 5 at which point the frustoconical portion 6 joins the process tube 7.

Figure 4:
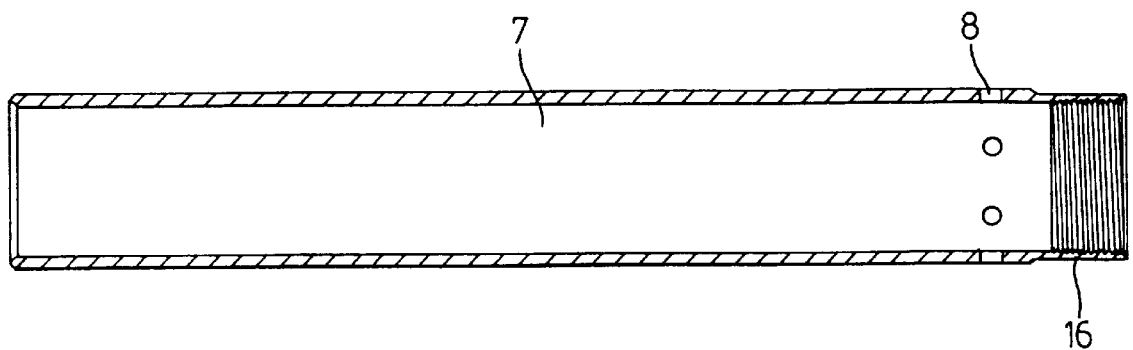
FIG. 4 shows a cross sectional view of the cylindrical portion of a hydrocyclone body of FIG. 1.

FIG. 4 shows the process tube 7. The free end of the process tube 7, that is, the end that is not connected to the frustoconical portion 6, has slightly narrower walls to allow it to fit snugly into the locating aperture 21 in the divider plate 2. The interior of this bevelled portion of the process tube 7 is threaded to allow insertion thereinto of the tube nut 18 which, in turn, holds the reject insert 10. Located in the wall of the process tube 7 just in front of the bevelled section of the process tube 7 are the accept outlets 8, six equidistant spaced apertures located through the process tube, through which apertures the heavier, water portion of the oil and water mixture passes having been separated in the body of the hydrocyclone 1.

Figure 5:
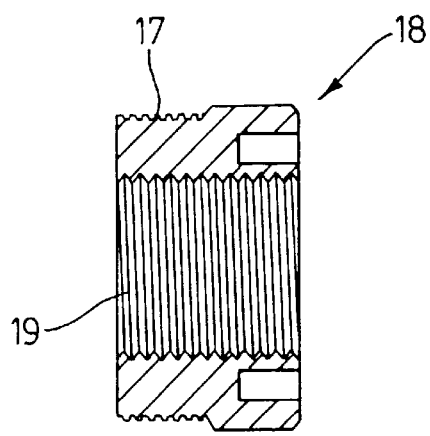
FIG. 5 shows the tube nut which comprises the part of the end of the cylindrical portion of a hydrocyclone of FIG. 1.

In FIG. 5, there is shown the tube nut 18 which connects with the interior of the bevelled end 16 of the process tube 7 by means of a thread 17 located on a bevelled exterior portion of the tube nut 18. The interior 19 of the tube nut 18 is also threaded so as to allow insertion thereinto of the reject insert 10.

Figure 6:
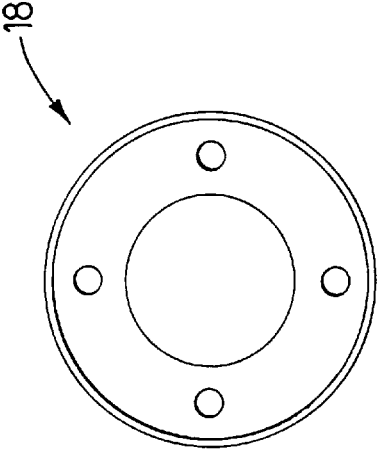
FIG. 6 shows an end view of the tube nut of FIG. 5.

FIG. 6 shows an end view, taken from the non-bevelled end, of the tube nut 18.

Figure 7:
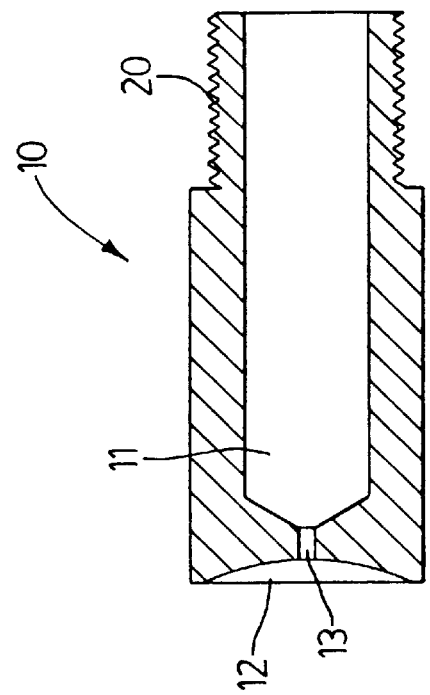
FIG. 7 shows a cross sectional view of the reject outlet and reject outlet chamber of a hydrocyclone of FIG. 1.

FIG. 7 shows the reject insert 10. One end of the insert 20 is threaded on the exterior thereof for securing the reject insert 10 within the similarly threaded interior 19 of the tube nut 18. The interior of the reject insert 10 is hollow, forming a reject chamber 11.

Figure 8:
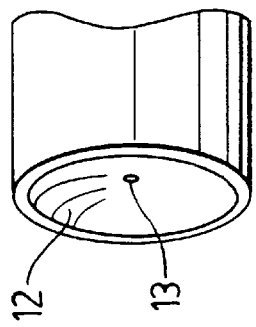
FIG. 8 shows a perspective view of the reject outlet of FIG. 7.

The free end 12 of the reject insert 10 is dished to aid fluid collection and in the centre thereof is the reject outlet 13 as can be seen in greater detail in FIG. 8.

Figure 9:
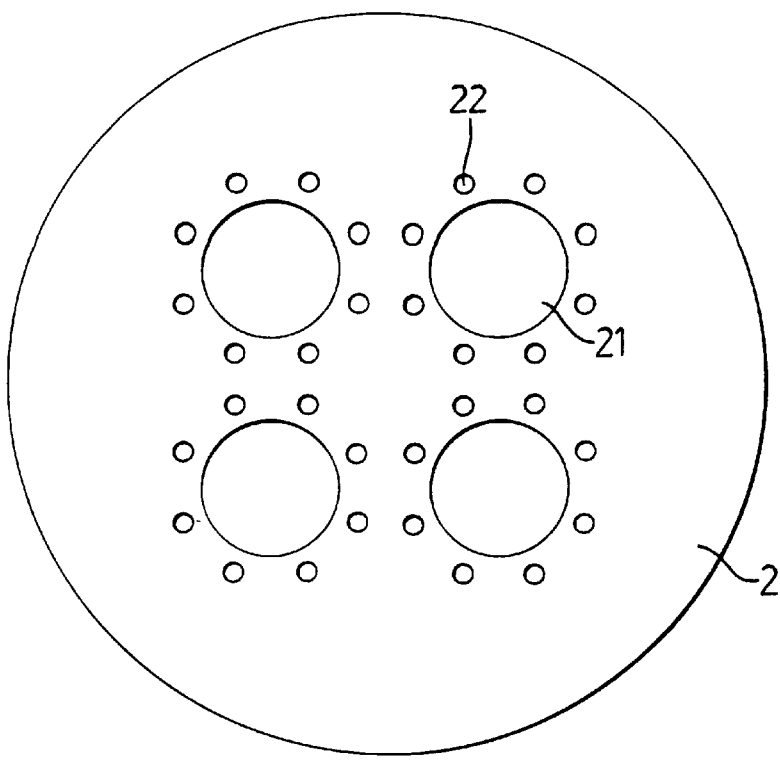
FIG. 9 shows a divider plate to which are attached four hydrocyclones of the present invention.

The divider plate 2, shown in FIG. 9, is adapted for use with four hydrocyclones 1 of the present invention used in parallel. Each quarter of the divider plate comprises a central locating aperture 21 within which is located the bevelled end of the process tube 14. Around the exterior of this locating aperture 21 are positioned, at equidistant intervals, securing apertures 22 by way of which the sealing ring 14 is secured to the divider plate 2.

Figure 10:
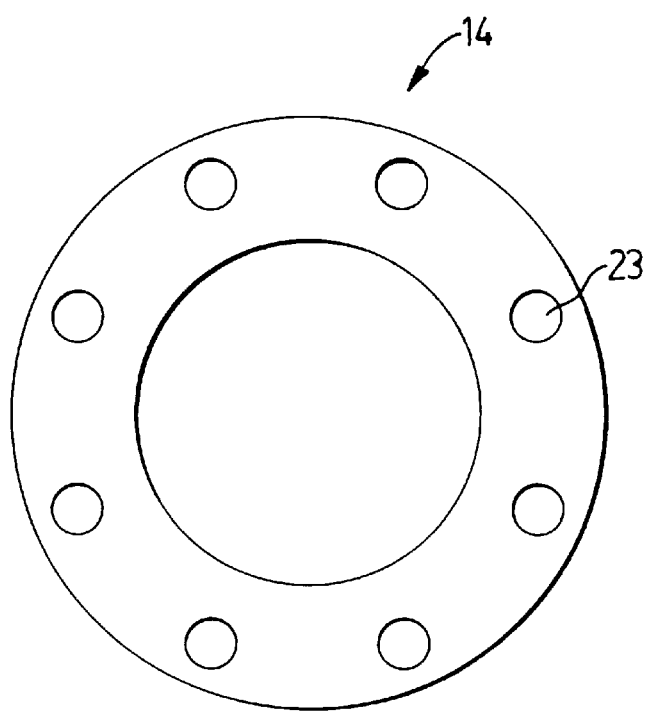
FIG. 10 shows a front view of a sealing ring for use in attaching a hydrocyclone to a divider plate.
Figure 12:
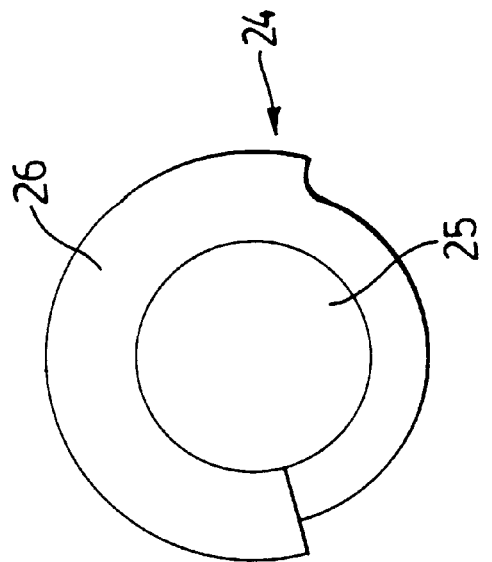
FIG. 12 shows a top plan view of the spiral insert of FIG. 10.

The sealing ring 14 shown in FIG. 10 seals the junction between the hydrocyclone 1 and the divider plate 2. The annular sealing ring 14 has, located therein, securing holes 23 which correspond to securing holes 22 and allow the seal ring 14 to be secured to the divider plate 2 when the two sets of securing holes 22, 23 are overlaid.

Figure 11:
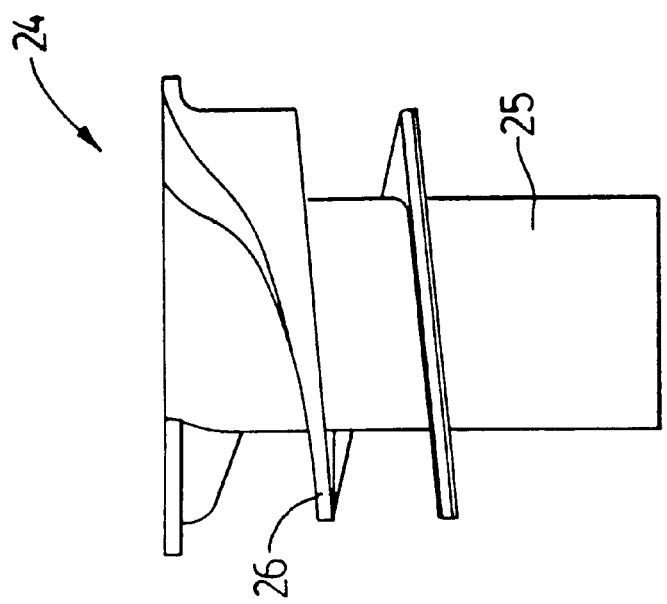
FIG. 11 shows a side view of a spiral insert for inclusion in the inlet chamber of a hydrocyclone of FIG. 1.

FIG. 11 shows the spiral insert 24 which is located within the inlet chamber 5 for creating a spiralling motion in fluid passed thereinto. The spiral insert 24 comprises a cylindrical core 25 around which is located a helical vane 26 which serves to cause the fluid entering the hydrocyclone 1 to move in a spiral direction to create the spiralling motion. The taper of the thickness of the helical vane 26 and the angle of the spiral may be varied to suit the particular application for which a hydrocyclone 1 is designed.

The hydrocyclone 1 is assembled by connecting the frustoconical portion 6 of the body to the process tube 7 and connecting the cap 3 to the open end of the inlet chamber 5. The reject insert 10 is attached to the tube nut 18 which, in turn, is attached to the interior 16 of the end of the process tube 7.

The end of the process tube 7 is inserted through the locating aperture 21 in the divider plate 2 and the sealing ring 14 is then placed onto the divider plate 2, on the other side from the hydrocyclone 1, with the securing apertures 23 located over the corresponding securing apertures 22 of the divider plate 2. The sealing ring is then affixed to the divider plate 2 by the securing apertures 22, 23 to seal the connection between the divider plate 2 and the hydrocyclone 1. An inlet pipe is attached to the inlet aperture 4 of the cap 3 and outlet pipes are attached to each of the accept outlets 8 located in the side of the process tube 7 adjacent the divider plate 2 as well as to the reject chamber 11. The spiral insert 24 is located in the inlet chamber 5 and may easily be removed therefrom for maintenance, by removal of the cap 3 from the hydrocyclone 1.

In a preferred embodiment of the present invention the hydrocyclone is mounted inside a pressure vessel. The pressure vessel may be divided into three sections, an outlet section at one end, an inlet section and the other end and a processing section in the middle. The hydrocyclone is mounted in the process section. The inlet section comprises an inlet through which the fluid to be separated is passed into an inlet chamber from which the fluid to be separated is passed into the hydrocyclone mounted inside the process section. The divider plate 2 divides the process section from the outlet section and, accordingly, the water from the accept outlets passes into the process section which thereby constitutes a water chamber surrounding the hydrocyclone. A water outlet is set into the side of the process section and the process section also comprises a pressure safety valve to avoid excessive pressure building up within the process section. The outlet section comprises an outlet chamber into which the reject outlet flows depositing the gas/oil/water mixture rejected from the hydrocyclone. At the bottom of the reject chamber is an outlet for the gas/oil/water emulsion rejected from the hydrocyclone. Optionally the top of the outlet chamber may comprise a further outlet for gas separated from the gas/oil/water emulsion. The provision of the inlet chamber, the outlet chamber and the water chamber allows short term storage of fluids prior to and after their processing by the hydrocyclone. This system can be used as a multi-stage system by taking the water outlet stream from the water outlet of a first unit and directing it in series to the inlet of a second unit for further separation.

In use, a fluid mixture such as oil and water flows into the inlet chamber 5 by way of the inlet aperture 4 located in the cap 3. The flow contacts the spiral insert device 24 the helical vane 26 of which causes the fluid to spiral creating high velocity and centrifugal force. The velocity and centrifugal force increases as the fluid passes down the frustoconical portion 6 of the body of the hydrocyclone 1 so that, upon entering the process tube 7, the fluids are of a velocity and force such that the heavier fluid, such as water, is forced to the periphery of the interior of the process tube 7 whilst the lighter fluid, such as oil, forms a central core in the centre of the process tube 7. As the separated fluids reach the end of the process tube 7, a central core of lighter fluid reaches the dished end 12 of the reject insert 10 is directed to the reject outlet 13 and passes therethrough into the reject chamber 11 thus producing a drop in pressure. The heavier fluid, at the periphery of the process tube 7, passes along the process tube 7, past the reject outlet 13 until it passes out of the process tube 7 via the accept outlet 8 located in the side wall of the process tube 7.

Pressure differential across the hydrocyclone 1 is maintained by central valves in the lines to the accept and reject outlets 8,13, which valves may be computer controlled so as to maintain the required differential pressure across the hydrocyclone 1.

In single hydrocyclone 1 according to the present invention, a fluid water mixture was directed through the hydrocyclone which mixture was produced water containing approximately 1,000 ppm of 16 Deg API OIL at approximately 25° C. with an inlet pressure of between 20 and 22 psig. The same test was carried out with conventional hydrocyclones.

The conventional hydrocyclones would not perform effectively at this pressure and the presence of a vortex was non-existent. However, the hydrocyclone according to the present invention performed well and separated the incoming fluid to a water outlet specification of 6 ppm oil in water. Tests indicated that the hydrocyclone could be capable of separating such a mixture to an outlet water quality of a greater purity than that achieved in this test.

Figure 13:
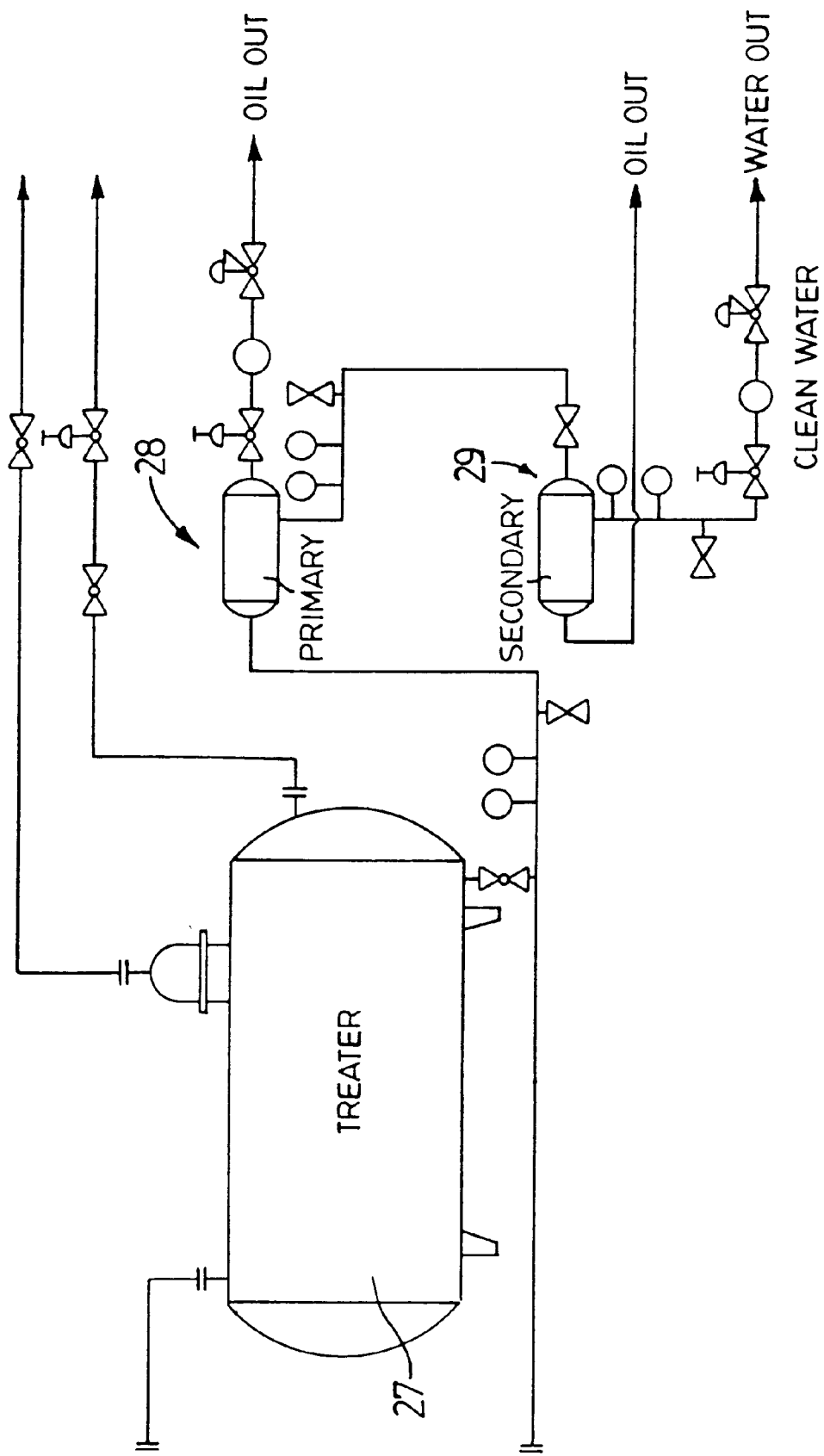
FIG. 13 shows, schematically, an oil treatment separation according to the present invention.

The system that was used comprised an oil treatment vessel designed by the inventors, which is the subject of co-pending PCT Patent Application No. PCT/CA94/00572. It was realised that the hydrocyclone of the present invention had the further advantage, because it operates at relatively low pressures, that the option was available to recirculate or reprocess that fluid by placing another hydrocyclone or hydrocyclone unit in series with the initial hydrocyclone or hydrocyclone unit. Accordingly, the system designed was that shown in FIG. 13. Crude oil was transferred to the oil treater 27. From the oil treater 27, produced water was removed and pumped to a primary hydrocyclone unit which comprised four hydrocyclones 1, as shown in FIG. 1, in parallel, attached to a divider plate 2 as shown in FIG. 9. From this primary hydrocyclone unit, oil was removed from the reject outlet whereas separated water was removed from the accept outlets 8 and from there was passed to a secondary hydrocyclone unit 29 of the same design as the primary hydrocyclone unit 28. The pipes were arranged such that the secondary hydrocyclone unit 29 was an option and need only be used if, at any stage of processing, the quality of water exiting the primary hydrocyclone unit 28 fell below required standards and needed further separation.

The system also allows the primary hydrocyclone unit to act as an inlet separator wherein the majority of the solution gas is removed and the inlet fluid is degassed prior to final processing in the secondary hydrocyclone unit. The secondary hydrocyclone unit is able to produce degassed inlet fluid and therefore separation of the water and oil mixture was greatly improved. The system included the modification wherein, if there was a pressure drop problem, such that the pressure driving the produced water was not sufficient to drive it through both hydrocyclones to achieve full separation, the first hydrocyclone unit (28) was automatically bypassed.

The hydrocyclone capacities were 10 gpm flow rate. The oil treater had a maximum water processing capacity of approximately 991 BBL/DAY when it was providing approximately 10–15 minutes of residence time which is typical of most oil treater designs. Each hydrocyclone tube was, therefore, capable of handling approximately ⅓ of the total water inlet flowrate from the treater vessel and the fourth hydrocyclone 1 in each hydrocyclone unit 28, 29 was a safety precaution.

Each of the eight hydrocyclones 1 in the two hydrocyclone units 28, 29 was individually valved to provide extra flexibility to cope with varying flowrates from either a different well or other inlets to the hydrocyclones 1, to allow each individual hydrocyclone 1 to cope with a drop or increase in flowrate. The inlet size of each hydrocyclone (1) was 1" NPS which provided the necessary inlet velocity for a wide range of inlet flows and enhanced and assisted hydrocyclone performance over that range of inlet flows.

The system was found to work very satisfactorily.

The hydrocyclone of the present invention allows onsite efficient separation of produced water in oil fills without the requirement of inefficient increasing of pressure of the produced water to allow for separation. The hydrocyclones of the present invention overcome the problems associated with prior art separation techniques, being efficient and economic without the requirement of high pressure differentials and without the associated problem of clogging orifices.

We claim:

1. A hydrocyclone for separating a fluid mixture into a lighter phase and a heavier phase comprising:
    a generally elongate hydrocyclone body having an inlet end and a remote outlet end, said body having:
        an elongate inlet chamber at said inlet end with an inlet for receiving said fluid mixture and a spiral insert located within the inlet chamber for creating a spiraling motion in said fluid mixture said insert having at least one helical vane arranged around a central cylindrical core;
        a frustoconical portion communicating with said inlet chamber; and,
        a cylindrical portion having a first end contiguous with said frustoconical portion and an opposed second end proximate to said remote outlet end, said opposed second end defining at least one accept outlet for removing said heavier phase and at least one reject outlet opening for removing said lighter phase.

2. The hydrocyclone of claim 1 wherein said frustoconical portion has a larger diameter end adjacent said inlet chamber and a smaller diameter end adjacent said cylindrical portion, and a smoothly tapered transition between said larger and smaller diameter ends for maintaining said spiraling motion of the fluid mixture from said inlet chamber to said cylindrical portion.

3. The hydrocyclone of claim 1 wherein said inlet is axially aligned with a longitudinal axis of said elongate inlet chamber.

4. The hydrocyclone of claim 1 wherein a plurality of said accept outlets is circumferentially spaced about said second end of the cylindrical portion.

5. The hydrocyclone of claim 1 wherein said at least one reject outlet opening is located adjacent a radial center of said second end of the cylindrical portion.

6. The hydrocyclone of claim 1 wherein said at least one reject outlet opening comprises a hollow, elongate reject insert defining a reject chamber, said insert having one end secured to said second end of the cylindrical portion and an opposed free end extending into said cylindrical portion, said free end being spaced further from said second end of said cylindrical portion than said at least one accept outlet.

7. The hydrocyclone of claim 6 wherein said free end of the reject insert is dished to collect and channel said lighter phase toward said reject outlet opening and into said reject chamber.

8. The hydrocyclone of claim 1 further comprising a valve means communicating with said at least one accept outlet and with said at least one reject outlet for providing an adjustable pressure differential across said hydrocyclone body.

9. A hyrocyclone for separating a fluid mixture into lighter phase and a heavier phase comprising:
    an elongate inlet chamber having an inlet axially aligned with a longitudinal axis of said inlet chamber for receiving said fluid mixture and a means for creating a spiraling motion in said fluid mixture; and,
    a hydrocyclone body having a first portion communicating with said inlet chamber for receiving said spiraling fluid mixture and maintaining said spiraling motion therethrough, a second cylindrical portion having a first end contiguous with said first portion and a opposed second end and a plurality of outlets at said second end for removing both said lighter phase and said heavier phase,
    wherein said outlets comprise a plurality of accept outlets circumferentially spaced about said second end of the second cylindrical portion for removing said heavier phase, and at least one reject outlet located adjacent a radial center of said second end of the second cylindrical portion for removing said lighter phase.

10. The hydrocyclone of claim 9 wherein said at least one reject outlet comprises a hollow, elongate reject insert defining a reject chamber, said insert having one end connected to said second end of the second cylindrical portion and an opposed free end extending into said second cylindrical portion, said free end being positioned closer to said first portion than of said accept outlets.

11. The hydrocyclone of claim 10 wherein said free end of the reject insert is dished to collect and channel said lighter phase toward said reject outlet and into said reject chamber.

12. The hydrocyclone of claim 9 wherein said first portion has a larger diameter end adjacent said inlet chamber and a smaller diameter end adjacent said second cylindrical portion, and a smoothly tapered transition between said larger and smaller diameter ends for maintaining said spiraling motion of the fluid mixture from said inlet chamber to said second cylindrical portion.

13. The hydrocyclone of claim 9 wherein said means for creating a spiraling motion comprises a spiral insert located within the inlet chamber, said insert having at least one helical vane arranged around a central cylindrical core.

14. The hydrocyclone of claim 9 further comprising a valve means communicating with said plurality of outlets for providing an adjustable pressure differential across said hydrocyclone.

15. A hydrocyclone for separating a fluid mixture into a first phase and a denser second phase comprising:

a generally elongate hydrocyclone body having an inlet end and a remote outlet end, said body having:
      an elongate inlet chamber at said inlet end having an inlet located at an axial end of said inlet chamber for providing a non-tangential entry of said fluid mixture thereinto, and a spiral insert for creating a spiraling motion in said fluid mixture;
      a frustoconical portion contiguous with said inlet chamber opposite said inlet for receiving said fluid mixture from said inlet chamber and maintaining said spiraling motion;
      a cylindrical portion having a first end contiguous with said frustoconical portion opposite said inlet chamber and an opposed second end adjacent said remote outlet end, said opposed second end defining at least one accept outlet for withdrawing said denser second phase and at least one reject outlet opening for removing said first phase.

16. The hydrocyclone of claim 15 wherein said inlet is axially aligned with a longitudinal axis of said elongate inlet chamber.

17. The hydrocyclone of claim 15 wherein said frustoconical portion has a larger diameter end adjacent said inlet chamber and a smaller diameter end adjacent said cylindrical portion, and a smoothly tapered transition between said larger and smaller diameter ends for maintaining said spiraling motion of the fluid mixture from said inlet chamber to said cylindrical portion.

18. The hydrocyclone of claim 15 wherein a plurality of said accept outlets is circumferentially spaced about said second end of the cylindrical portion, and said at least one reject outlet opening is located adjacent a radial center of said second end of the cylindrical portion.

19. A method of separating a fluid mixture comprising passing said fluid mixture through a hydrocyclone according to claim 15.

* * * * *